(12) United States Patent
Okuwaki et al.

(10) Patent No.: US 7,705,931 B2
(45) Date of Patent: Apr. 27, 2010

(54) PLANAR LIGHT-EMITTING DEVICE AND DISPLAY APPARATUS HAVING THE SAME

(75) Inventors: Daisaku Okuwaki, Fujiyoshida (JP); Tatsuro Yamada, Fujiyoshida (JP); Kenta Miura, Fujikawaguchiko-machi (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 147 days.

(21) Appl. No.: 12/167,659

(22) Filed: Jul. 3, 2008

(65) Prior Publication Data
US 2009/0009689 A1     Jan. 8, 2009

(30) Foreign Application Priority Data
Jul. 6, 2007   (JP)   ............................. 2007-179074
Apr. 22, 2008  (JP)   ............................. 2008-111844

(51) Int. Cl.
G02F 1/13337  (2006.01)
F21V 7/04     (2006.01)

(52) U.S. Cl. ........................................ 349/65; 362/612

(58) Field of Classification Search .................... 349/65, 349/66, 67, 68, 69, 87; 362/611, 612, 615, 362/616, 617, 628
See application file for complete search history.

(56) References Cited

U.S. PATENT DOCUMENTS

| | | | | |
|---|---|---|---|---|
| 6,437,840 B1 * | 8/2002 | Arikawa et al. | ............... | 349/62 |
| 7,206,040 B2 * | 4/2007 | Kano | ........................... | 349/67 |
| 7,547,130 B2 * | 6/2009 | Tsuruta et al. | ............... | 362/627 |
| 2003/0160911 A1 * | 8/2003 | Kano | ........................... | 349/65 |
| 2007/0058392 A1 | 3/2007 | Watanabe et al. | | |
| 2008/0158476 A1 * | 7/2008 | Miyashita | ...................... | 349/65 |
| 2009/0040428 A1 * | 2/2009 | Shimura | ...................... | 349/65 |
| 2009/0273733 A1 * | 11/2009 | Shimura et al. | ............... | 349/65 |
| 2009/0316072 A1 * | 12/2009 | Okumura et al. | .............. | 349/64 |

FOREIGN PATENT DOCUMENTS

| | | |
|---|---|---|
| JP | 2004-117606 A | 4/2004 |
| JP | 2006-228588 A | 8/2006 |
| JP | 2007-80544 A | 3/2007 |

\* cited by examiner

*Primary Examiner*—Akm E Ullah
(74) *Attorney, Agent, or Firm*—Brinks Hofer Gilson & Lione

(57) ABSTRACT

A planar light-emitting device includes a lightguide plate (7), a light source including at least one light-emitting package (6) that makes light enter the lightguide plate, and a reflecting sheet (10, 11) that returns light leaking from the light source. The lightguide plate has an upper surface as a light exit surface, a lower surface opposite to the upper surface, and a peripheral edge surface a part of which is disposed as a light entrance surface (7'). The light source includes at least one light-emitting package (6) having a substrate, at least one light-emitting element mounted on a mount surface of the substrate, and a light-transmitting resin provided on the mount surface to seal the light-emitting element. The reflecting sheet is disposed to face at least one of the upper and lower surfaces of the lightguide plate and to extend beyond the light entrance surface as far as over or underneath the light-transmitting resin.

20 Claims, 4 Drawing Sheets

[Fig. 1]
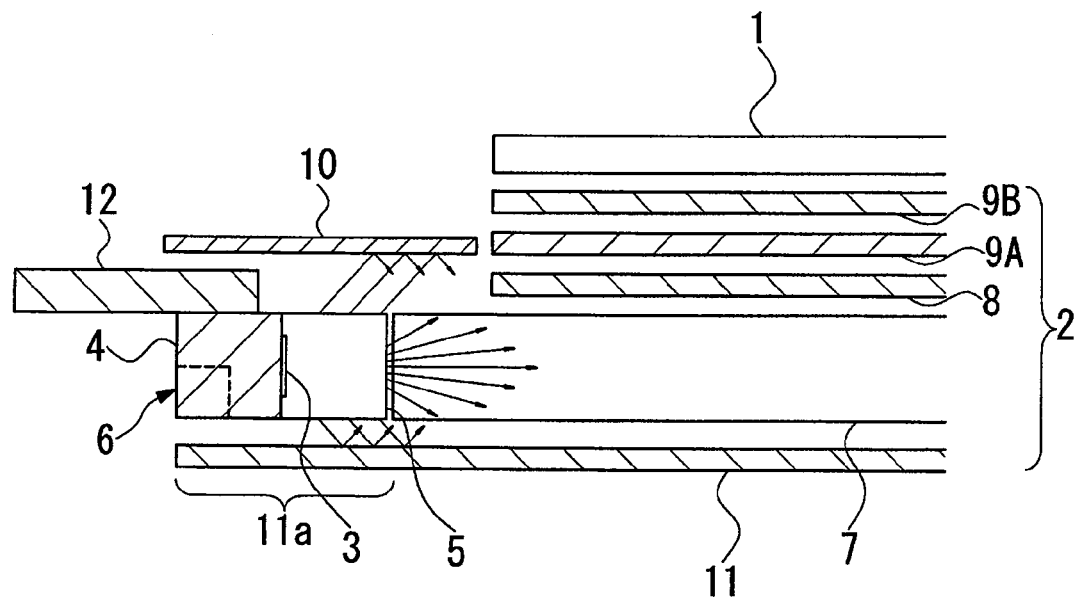
[Fig. 2]
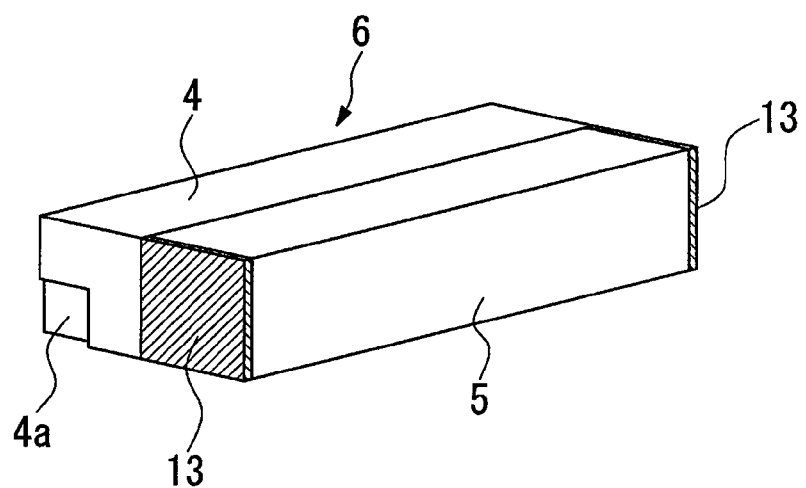

[Fig. 3]
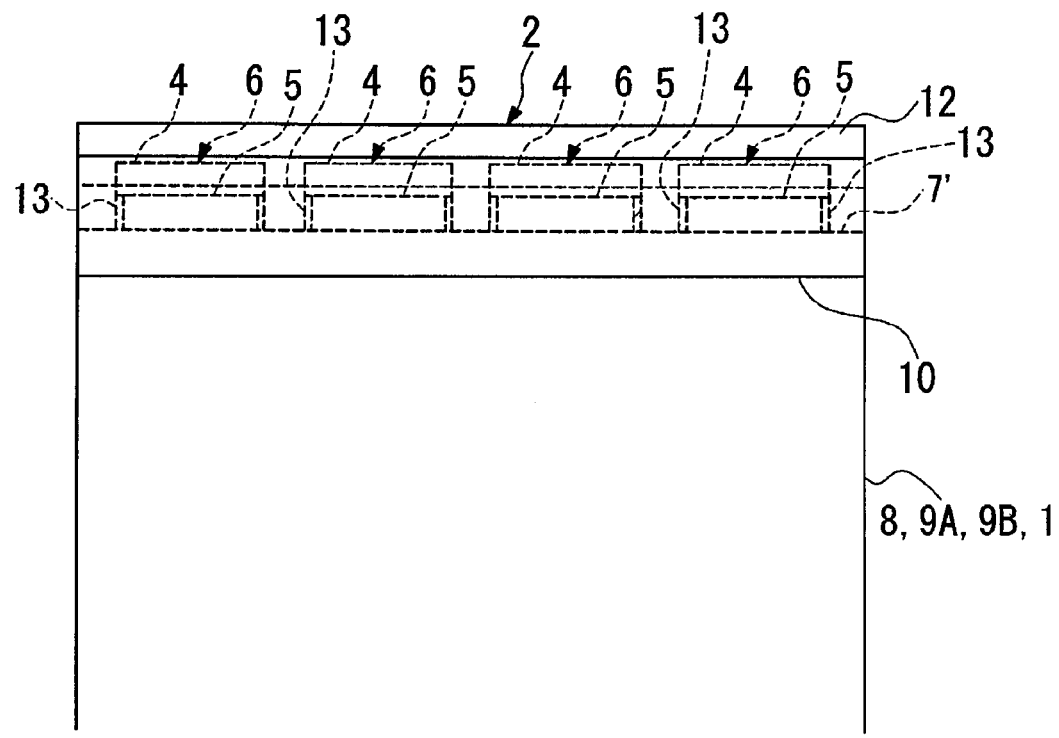
[Fig. 4]
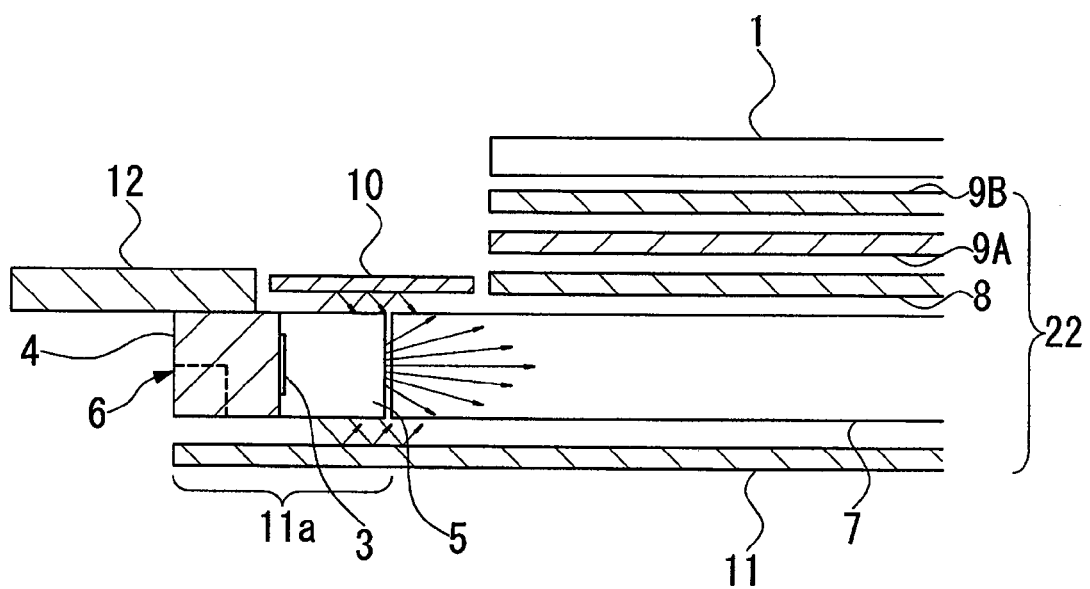

[Fig. 5]
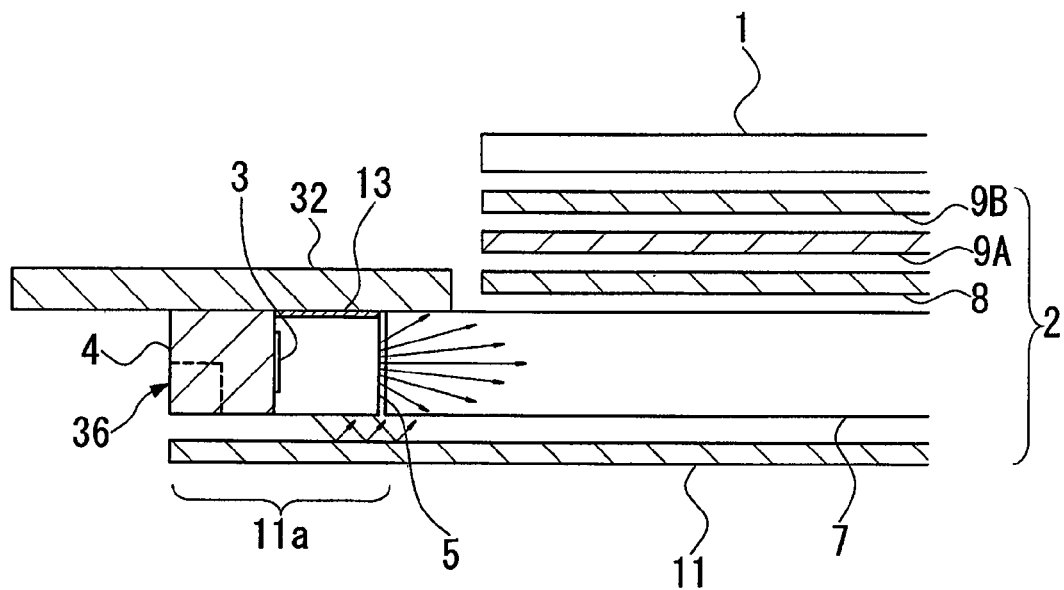
[Fig. 6]
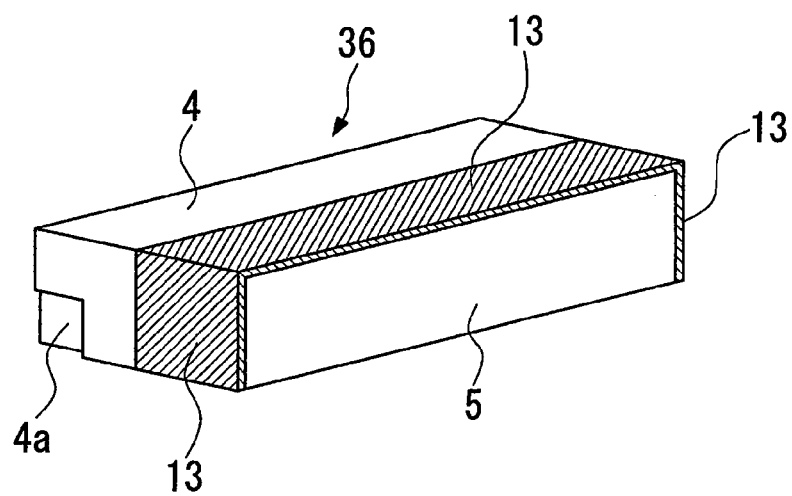

[Fig. 7]
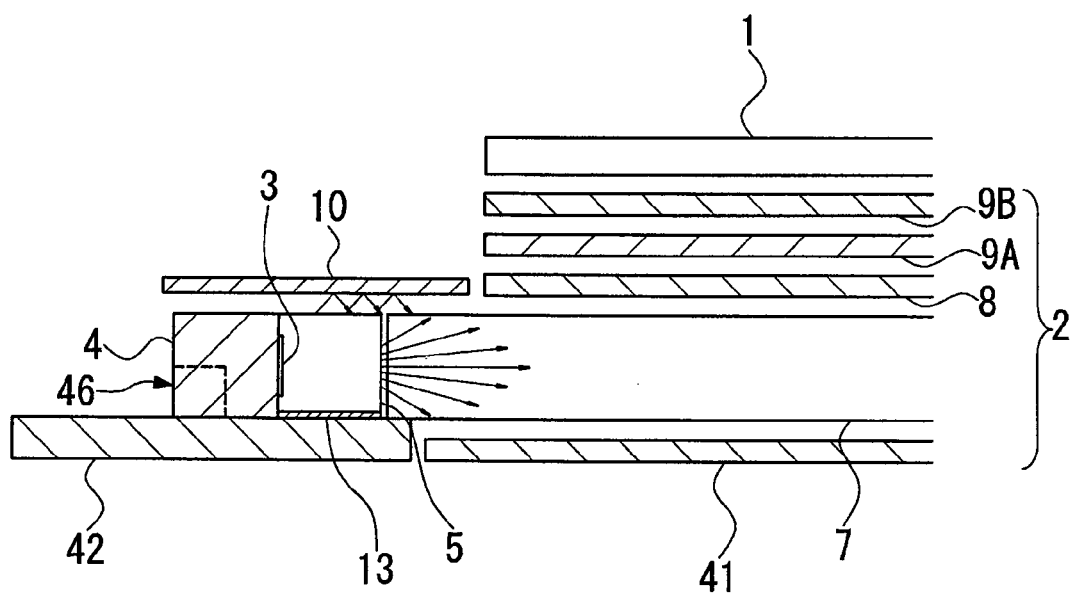
[Fig. 8]
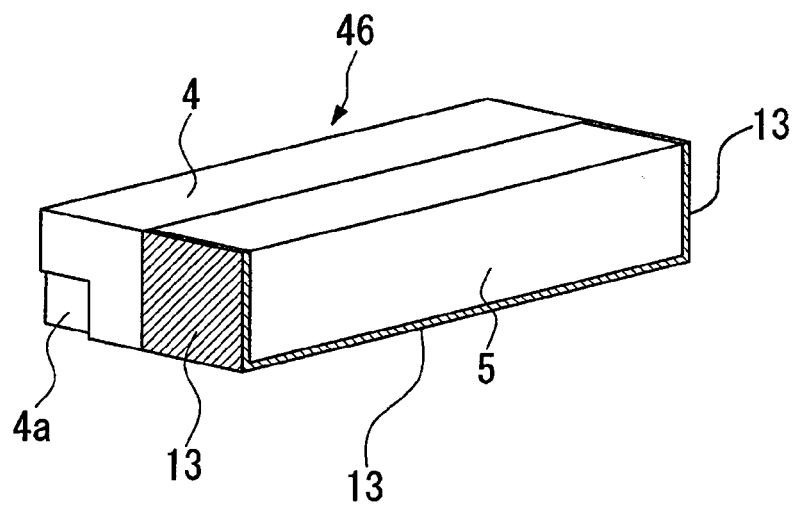

PLANAR LIGHT-EMITTING DEVICE AND DISPLAY APPARATUS HAVING THE SAME

This application claims priority under 35 U.S.C. §119 to Japanese Patent Application No's. JP2007-179074 filed on Jul. 6, 2007 and JP2008-111844 filed on Apr. 22, 2008, the entire contents of which are hereby incorporated by reference.

TECHNICAL FIELD

The present invention relates to a planar light-emitting device and also relates to a display apparatus, e.g. a liquid crystal display apparatus, using a planar light-emitting device.

BACKGROUND

In recent years, liquid crystal display apparatus have been widely used in displays of mobile phones, personal digital assistants (PDAs), etc. These liquid crystal display apparatus employ a backlight unit that applies illuminating light to a liquid crystal display panel (LCD) from the back thereof. Japanese Patent Application Publication No. 2004-117606, for example, discloses a backlight unit having a light-emitting diode (LED) light source and a lightguide plate that receives light emitted from the LED light source through a part of its peripheral edge surface. The lightguide plate diffuses the received light therein and emits it from the upper surface thereof. The backlight unit further has a reflecting sheet disposed underneath the lightguide plate to reflect light leaking from the lightguide plate back thereinto.

Japanese Patent Application Publication No. 2006-228588 proposes a planar lighting device including an LED light source having a substrate, an LED element mounted on the substrate, and a light-transmitting resin member that seals the LED element. The resin member has a semispherical shape projecting outward along an axis of light from the LED element. The planar lighting device further includes a lightguide plate having a light entrance surface provided with a recess into which the projection of the transparent resin member is fitted. The planar lighting device allows light from the LED element to enter the lightguide plate efficiently through the projection and the recess.

The invention disclosed in Japanese Patent Application Publication No. 2006-228588, however, has difficulty in accurately aligning the LED element mounted on the substrate and the semispherical-shaped resin member, which seals the LED element. Therefore, even if the semispherical-shaped resin member is satisfactorily fitted in the recess provided in the lightguide plate, the lightguide plate may be unable to appropriately receive light from the LED element, resulting in such problems as a reduction in luminance at the light exit surface of the backlight unit concerned and a degradation in the uniformity of luminance.

SUMMARY OF THE INVENTION

Accordingly, an object of the present invention is to provide a planar light-emitting device that is free from the above-described problems with the related art, and also provide a display apparatus having the planar light-emitting device.

The present invention provides a planar light-emitting device including a lightguide plate having an upper surface as a light exit surface, a lower surface opposite to the upper surface, and a peripheral edge surface between respective peripheral edges of the upper surface and the lower surface, and a part of the peripheral edge being disposed as a light entrance surface. The planar light-emitting device further includes at least one light-emitting package including a substrate having a mount surface, at least one light-emitting element mounted on the mount surface of the substrate, and a light-transmitting resin provided on the mount surface to seal the light-emitting element. The light-transmitting resin has a rear surface contacting the mount surface and a flat front surface opposite to the rear surface and abutting on the light entrance surface of the lightguide plate. Further, the planar light-emitting device includes a reflecting sheet disposed to face at least one of the upper surface and lower surface of the lightguide plate. The reflecting sheet extends beyond the light entrance surface as far as over the light-transmitting resin and has a reflecting surface facing both the lightguide plate and the light-transmitting resin.

In the planar light-emitting device of the present invention, unlike the invention disclosed in the above-described Japanese Patent Application Publication No. 2006-228588, the light-emitting package and the lightguide plate are abutted at the flat surfaces thereof. Therefore, even if a certain misalignment occurs between the light-emitting package and the lightguide plate, there will be substantially no reduction in the amount of light entering the lightguide plate. Further, the reflecting sheet can return light leaking from the light-transmitting resin of the light-emitting package back into the light-transmitting resin or make the leaking light enter the lightguide plate. Accordingly, it becomes possible with the planar light-emitting device to facilitate the assembling thereof while maintaining the desired luminance at the light exit surface thereof.

Specifically, the reflecting sheet may have a width covering the entire length of the light entrance surface of the lightguide plate. The purpose of this is not only to direct light toward the light entrance surface of the lightguide plate 7 but also to prevent an unevenness of luminance in an area adjacent to the light entrance surface from appearing on the LCD screen.

More specifically, the at least one light-emitting package may comprise a plurality of light-emitting packages that are disposed in a row at predetermined intervals along the light entrance surface of the lightguide plate.

The reflecting sheet may comprise a first reflecting sheet and a second reflecting sheet. The first reflecting sheet is disposed to face a portion of the upper surface of the lightguide plate adjacent to the light entrance surface and to extend beyond the side edge surface to face the upper surface of the light-transmitting resin. The second reflecting sheet is disposed to face substantially the whole of the lower surface of the lightguide plate and to extend beyond the light entrance surface to face the lower surface of the light-transmitting resin.

The second reflecting sheet is a reflecting sheet that is generally disposed to face substantially the whole lower surface of the lightguide plate and that is, in the present invention, extended underneath the light-emitting package to collect light leaking from the lower surface of the light-transmitting resin.

Specifically, the arrangement may be as follows. The substrate is a substantially rectangular parallelepiped member having a rectangular front surface as the mount surface, a rear surface opposite to the front surface, an upper surface and a lower surface that each extends between the front surface and the rear surface, and a pair of laterally opposite side surfaces. The light-transmitting resin is a substantially rectangular parallelepiped member having an upper surface and a lower surface that each extends between the front surface and rear surface of the light-transmitting resin, and further having a pair of laterally opposite side surfaces. The respective upper surfaces of the substrate, the light-transmitting resin and the lightguide plate are substantially flush with each other, and the respective lower surfaces of the substrate, the light-transmitting resin and the lightguide plate are substantially flush with each other.

In this case, the planar light-emitting device may further include a flexible printed wiring board disposed on the upper surface of the substrate. The flexible printed wiring board extends beyond the rear surface of the substrate. The first reflecting sheet is disposed above the flexible printed wiring board.

Alternatively, the first reflecting sheet may be disposed at substantially the same level as the flexible printed wiring board.

The light-transmitting resin may have regular reflection layers on the laterally opposite side surfaces. The regular reflection layers have reflecting surfaces facing the laterally opposite side surfaces, respectively. The regular reflection layers prevent leakage of light from the laterally opposite side surfaces.

The planar light-emitting device may be arranged as follows. The light-transmitting resin is a substantially rectangular parallelepiped member having an upper surface and a lower surface that each extends between the front surface and rear surface of the light-transmitting resin and further having a pair of laterally opposite side surfaces. The reflecting sheet faces at least one of the upper surface and lower surface of the lightguide plate. The reflecting sheet extends beyond the light entrance surface to face one of the upper surface and lower surface of the light-transmitting resin that corresponds to the at least one of the upper surface and lower surface of the lightguide plate. The light-transmitting resin has a regular reflection layer formed on an other of the upper surface and lower surface of the light-transmitting resin. The regular reflection layer has a reflecting surface on the inner side thereof. In this case, the reflecting sheet is a single-layer reflecting sheet.

In this case, the light-transmitting resin may have regular reflection layers on the laterally opposite side surfaces. The regular reflection layers have reflecting surfaces facing the laterally opposite side surfaces, respectively.

In addition, the present invention provides a display apparatus including an image display panel and a planar light-emitting device arranged as stated above to irradiate the image display panel with light.

Embodiments of the present invention will be explained below with reference to the accompanying drawings. It should be noted that the terms "upper", "lower", "front", "rear", etc. as employed in this specification to express position relationship are used only for explanatory purposes, and that these terms should not be construed as specifying a particular absolute positional relationship in the planar light-emitting device and display apparatus according to the present invention.

BRIEF DESCRIPTION OF THE DRAWINGS

FIG. 1 is a schematic sectional view of an essential part of a display apparatus having a planar light-emitting device (backlight unit) according to a first embodiment of the present invention.

FIG. 2 is a perspective view of a light-emitting package used as a light source in the backlight unit shown in FIG. 1.

FIG. 3 is a schematic plan view of an essential part of the backlight unit shown in FIG. 1.

FIG. 4 is a schematic sectional view of an essential part of a display apparatus having a backlight unit according to a second embodiment of the present invention.

FIG. 5 is a schematic sectional view of an essential part of a display apparatus having a backlight unit according to a third embodiment of the present invention.

FIG. 6 is a perspective view of a light-emitting package used as a light source in the backlight unit shown in FIG. 5.

FIG. 7 is a schematic sectional view of an essential part of a display apparatus having a backlight unit according to a fourth embodiment of the present invention.

FIG. 8 is a perspective view of a light-emitting package used as a light source in the backlight unit shown in FIG. 7.

DETAILED DESCRIPTION OF THE PREFERRED EMBODIMENTS

Referring to FIGS. 1 to 3, a display apparatus according to a first embodiment of the present invention is, as shown in FIG. 1, a display apparatus applicable, for example, to liquid crystal display apparatus of mobile phones and PDAs, and has an LCD 1 as an image display panel and a backlight unit 2 disposed at the back of the LCD 1.

The backlight unit 2 in this embodiment includes a plurality of light-emitting packages 6, a lightguide plate 7, a diffusing sheet 8, a combination of a first prism sheet 9A and a second prism sheet 9B, a first reflecting sheet 10, a second reflecting sheet 11, and a flexible printed wiring board 12. Each light-emitting package 6 has a rectangular parallelepiped substrate 4, a plurality of light-emitting elements 3 mounted on a mount surface of the substrate 4 at predetermined intervals, and a rectangular parallelepiped light-transmitting resin 5 disposed on the mount surface of the substrate 4 and sealing the light-emitting elements 3. The lightguide plate 7 has an upper surface, a lower surface opposite to the upper surface, and a peripheral edge surface between the upper surface and the lower surface, and a part of the peripheral edge surface as a light entrance surface, which abuts on a front surface of the light-transmitting resin 5 that seals the light-emitting elements 3 on the mount surface of the substrate 4. The diffusing sheet 8 is disposed directly above the lightguide plate 7 to diffuse light from the lightguide plate 7. The first prism sheet 9A and the second prism sheet 9B are stacked directly above the diffusing sheet 8 to collimate light from the diffusing sheet 8 as upward illuminating light directed toward the LCD 1. The first reflecting sheet 10 is disposed directly above the light-emitting packages 6 and extends over the light entrance surface to the upper surface of the lightguide plate 7. The first reflecting sheet 10 extends to the upper surface at area adjacent to the light entrance surface, and does not overlap other sheets or display disposed above the upper surface of the lightguide plate 7 at its end extending to the upper surface of the lightguide plate. The second reflecting sheet 11 is disposed under the lower surface of the lightguide plate 7 to extend under the light-transmitting resin 5. The flexible printed wiring board 12 is connected to the upper surface of the substrate 4.

The light-emitting elements 3 are surface-mount type LED elements. For example, each light-emitting element 3 may be a blue (wavelength λ: 470 to 490 nm) LED element or an ultraviolet (wavelength λ: less than 470 nm) LED element, which is formed by stacking a plurality of semiconductor layers of a gallium nitride compound semiconductor (e.g. InGaN compound semiconductor) on an insulating substrate, e.g. a sapphire substrate.

The light-transmitting resin 5 that seals the light-emitting elements 3 is, for example, a transparent resin containing a fluorescent substance, which is formed by adding, for example, yttrium aluminum garnet (YAG) fluorescent substance into a silicone resin or the like as a main component. The YAG fluorescent substance converts blue or ultraviolet light from the light-emitting elements 3 into yellow light, and white light is produced by color mixing effect. Various light-emitting elements in addition to those described above are usable to emit white light.

As shown in FIG. 2, the light-transmitting resin 5 has regular reflection layers 13 provided on both side end surfaces thereof. Each regular reflection layer 13 has a reflecting surface on the inner side thereof. The regular reflection layers 13 may be regular reflection members, for example, of a white resin or silver, or light-reflecting metal films evaporated on the light-transmitting resin 5.

The substrate 4 is formed of a glass epoxy resin, for example. A rectangular side surface of the substrate 4 is used as a mount surface for the light-emitting elements 3. The substrate 4 has a pair of electrode patterns 4a provided on the opposite ends thereof. The electrode patterns 4a are electrically connected to the electrodes of the light-emitting elements 3.

The lightguide plate 7 is formed of a transparent polycarbonate or acrylic resin, for example.

The first reflecting sheet 10 is fixedly disposed directly above the flexible printed wiring board 12. As shown in FIG. 3, the first reflecting sheet 10 is at least as wide as the light entrance surface 7' of the lightguide plate 7. The first reflecting sheet 10 may be formed, for example, of a dielectric multilayer film having a higher reflectance (e.g. 98% or more) than that of the regular reflection layers 13. The first reflecting sheet 10 is fixedly bonded, for example, to a holder (not shown) for the flexible printed wiring board 12 or a holder (not shown) for the various sheets of the backlight unit 2.

The second reflecting sheet 11 is disposed to cover the whole lower surface of the lightguide plate 7 and has an extension 11a extending as far as underneath the light-transmitting resin 5. The second reflecting sheet 11 is a metal sheet, film or foil having a light-reflecting function at the upper surface thereof. In this embodiment, a film provided with an evaporated silver layer is employed as the second reflecting sheet 11. It should be noted that an evaporated aluminum layer or the like may be used in place of the evaporated silver layer. It is also possible to use as the first reflecting sheet 10 an LCD-fixing sheet that is used to fix the various sheets of the backlight unit 2 to a holder (not shown). In this case, the lower side of the LCD-fixing sheet is a reflecting surface formed of a material having a light-reflecting function, e.g. silver.

The diffusing sheet 8 is formed by, for example, dispersing silica particles into a transparent resin, e.g. an acrylic resin, or a polycarbonate resin.

The first prism sheet 9A and the second prism sheet 9B are transparent sheet-shaped members that collect light exiting from the diffusing sheet 8 and direct it upward toward the LCD 1. The first and second prism sheets 9A and 9B have on their upper sides a multiplicity of mutually parallel elongated prisms, respectively. The respective prisms of the first and second prism sheets 9A and 9B are disposed to intersect each other, and the prisms of the first prism sheets 9A are disposed to extend in a direction which intersects the optical axes of the light-emitting packages 6 to obtain collimated light toward the LCD 1.

The LCD 1 is a transmissive or semitransmissive LCD. In the case of a semitransmissive LCD, for example, it has a panel body having a liquid crystal material, e.g. TN liquid crystal or STN liquid crystal, sealed with a sealant in a gap between an upper substrate and a lower substrate, each having a transparent electrode layer, an alignment film and a polarizer. The semitransmissive LCD further has a semitransmitting-reflecting sheet having both light-transmitting and -reflecting functions, which is provided underneath the panel body.

In the backlight unit 2 of this embodiment, the lightguide plate 7 is disposed with its flat side edge surface abutting on the flat front surface of the light-transmitting resin 5 having a substantially rectangular parallelepiped configuration. Therefore, unlike the above-described Japanese Patent Application Publication No. 2006-228588, the assembling of the light-emitting packages 6 and the lightguide plate 7 is easy, and even if a certain misalignment occurs between the light-emitting packages 6 and the lightguide plate 7 during assembling, satisfactory optical characteristics required for the backlight unit 2 can be maintained.

Further, the backlight unit 2 has the first and second reflecting sheets 10 and 11. These reflecting sheets 10 and 11 efficiently reflect light beams exiting upward and downward from the upper and lower surfaces of the light-transmitting resin 5 back thereinto or into the lightguide plate 7. Accordingly, it is possible to increase the luminance at the light exit surface of the backlight unit 2. In addition, the first reflecting sheet 10 prevents light from the light-emitting packages 6 from directly entering members other than the lightguide plate 7, such as the diffusing sheet 8, the first prism sheet 9A, and the second prism sheet 9B. Therefore, it is possible to suppress luminance unevenness at the light exit surface of the backlight unit 2. It should be noted that the first reflecting sheet 10, which has a high reflectance, makes it possible to reflect light exiting upward from the light-emitting elements 3 and to direct the light toward the light entrance surface of the lightguide plate 7 efficiently, resulting in a higher luminance at the light exit surface of the backlight unit 2 than in the case of providing a white resin layer on the upper surface of the light-transmitting resin 5.

Because the first and second reflecting sheets 10 and 11 are at least as wide as the entire length of the light entrance surface of the lightguide plate 7 and the first reflecting sheet 10 covers above the upper surface of the lightguide plate at an area adjacent to the light entrance surface, it is possible not only to direct light toward the light entrance surface of the lightguide plate 7 but also to prevent an unevenness of luminance in an area adjacent to the light entrance surface from appearing on the LCD screen. Further, because a single reflecting sheet 10 (11) is provided at each of the upper and lower sides of the light-emitting packages 6 instead of preparing the number of reflecting sheets corresponding to the number of light-emitting packages 6, it is possible to reduce the component cost, the number of assembling steps and the number of parts.

Further, the light-transmitting resin 5 has on both side end surfaces thereof regular reflection layers 13 each having a reflecting surface on the inner side thereof. The regular reflection layers 13 inwardly reflect emitted light diverging toward the left and right side end surfaces of the light-transmitting resin 5 and allow the light to enter the lightguide plate 7. Therefore, it is possible to achieve a higher luminance at the light exit surface of the backlight unit 2.

Further, the second reflecting sheet 11 disposed underneath the lightguide plate 7 has an extension 11a extending underneath the light-transmitting resin 5. Therefore, it is unnecessary to separately prepare a reflecting sheet to be disposed underneath the light-transmitting resin 5.

Accordingly, the display apparatus having the backlight unit 2 can be assembled easily while maintaining high optical characteristics. In addition, the display apparatus has an increased luminance at the light exit surface. Thus, the display apparatus is particularly suitably applicable to liquid crystal displays of mobile phones, PDAs, etc.

A second embodiment of the planar light-emitting device and display apparatus according to the present invention will be explained below with reference to FIG. 4. It should be noted that in the following embodiments the same constituent elements as those explained in the foregoing first embodiment are denoted by the same reference numerals as used in the first embodiment, and a description thereof is omitted herein.

In the foregoing first embodiment, the first reflecting sheet 10 is stacked over the flexible printed wiring board 12, whereas, in the second embodiment, the first reflecting sheet 10 is, as shown in FIG. 4, disposed between the flexible printed wiring board 12 and the diffusing sheet 8 at substantially the same level (height) as these members. The first reflecting sheet 10 in the second embodiment is fixedly bonded, for example, to the lightguide plate 7, the light-transmitting resin 5, or a holder (not shown) for the various sheets of the backlight unit 22.

In the second embodiment, the first reflecting sheet 10 is disposed adjacent to the flexible printed wiring board 12 in substantially the same plane. Therefore, the backlight unit 22 is prevented from increasing in thickness.

Third and fourth embodiments of the planar light-emitting device and display apparatus according to the present invention will be explained below with reference to FIGS. 5 to 8.

In the third embodiment, as shown in FIGS. 5 and 6, a regular reflection layer 13 is formed on the upper surface of the light-transmitting resin 5 in addition to the regular reflection layers 13 on both side end surfaces thereof, and the first reflecting sheet 10 is omitted, which is disposed directly above the light-transmitting resin 5 in the first embodiment.

The flexible printed wiring board 32 extends to the upper surface at area adjacent to the light entrance surface, and does not overlap other sheets or display disposed above the upper surface of the lightguide plate 7 at its end extending to the upper surface of the lightguide plate 7.

In the third embodiment, the first reflecting sheet 10 can be omitted, although a higher luminance can be obtained at the light exit surface of the backlight unit 2 by disposing high-reflectance reflecting sheets at both the upper and lower sides of the light-transmitting resin 5 as in the first embodiment. Consequently, the number of parts can be reduced, and costs can be reduced. Further, because the flexible printed wiring board 32 extends over the light entrance surface of the lightguide plate 7, it is possible to direct light exiting upward from the light-emitting packages 36 toward the light entrance surface and to prevent the light from directly entering members other than the lightguide plate 7, such as the diffusing sheet 8, the first prism sheet 9A, and the second prism sheet 9B.

In the foregoing first embodiment, the second reflecting sheet 11 extends as far as underneath the light-emitting packages 6, whereas, in the fourth embodiment, as shown in FIGS. 7 and 8, the second reflecting sheet 41 does not extend as far as underneath the light-transmitting resin 5, but instead, a regular reflection layer 13 is also formed on the lower surface of the light-transmitting resin 5. It should be noted that the flexible printed wiring board 42 is provided underneath the light-emitting packages 46. In the fourth embodiment, the second reflecting sheet 41 need not extend as far as underneath the light-transmitting resin 5. Therefore, the second reflecting sheet 41 can be correspondingly reduced in size, and the component cost can be reduced.

It should be noted that the present invention is not necessarily limited to the foregoing embodiments but can be modified in a variety of ways without departing from the scope of the present invention. For example, in the foregoing embodiments, the regular reflection layers 13 are preferably provided on both side end surfaces of the light-transmitting resin 5, as stated above. However, the side end surfaces of the light-transmitting resin 5 may be exposed without providing regular reflection layers 13 thereon. Although the diffusing sheet 8 is used in the foregoing embodiments, the backlight unit may omit the diffusing sheet 8. Although in the foregoing embodiments the LCD 1 is employed as an image display panel, other types of image display panels may be used, for example, an electronic paper.

What is claimed is:

1. A planar light-emitting device comprising:

a lightguide plate having an upper surface as a light exit surface, a lower surface opposite to the upper surface, and a peripheral edge surface between respective peripheral edges of the upper surface and the lower surface, and a part of the peripheral edge being disposed as a light entrance surface;

at least one light-emitting package including a substrate having a mount surface, at least one light-emitting element mounted on the mount surface of the substrate, and a light-transmitting resin provided on the mount surface to seal the light-emitting element, the light-transmitting resin having a rear surface contacting the mount surface and a flat front surface opposite to the rear surface and abutting on the light entrance surface of the lightguide plate; and a reflecting sheet disposed to face at least one of the upper surface and lower surface of the lightguide plate, the reflecting sheet extending beyond the light entrance surface and having a reflecting surface facing both the lightguide plate and the light-transmitting resin.

2. The planar light-emitting device of claim 1, wherein the reflecting sheet has a width covering an entire length of the light entrance surface of the lightguide plate.

3. The planar light-emitting device of claim 2, wherein the at least one light-emitting package comprises a plurality of light-emitting packages, the light-emitting packages being disposed in a row at predetermined intervals along the light entrance surface of the lightguide plate.

4. The planar light-emitting device of claim 2, wherein the reflecting sheet comprises:

a first reflecting sheet disposed to face a portion of the upper surface of the lightguide plate adjacent to the light entrance surface, the first reflecting sheet extending beyond the light entrance surface to face the upper surface of the light-transmitting resin; and a second reflecting sheet disposed to face substantially a whole of the lower surface of the lightguide plate, the second reflecting sheet extending beyond the light entrance surface to face the lower surface of the light-transmitting resin.

5. The planar light-emitting device of claim 2, wherein the substrate is a substantially rectangular parallelepiped member having a rectangular front surface as the mount surface, a rear surface opposite to the front surface, an upper surface and a lower surface that each extends between the front surface and the rear surface, and a pair of laterally opposite side surfaces;

the light-transmitting resin being a substantially rectangular parallelepiped member having an upper surface and a lower surface that each extends between the front surface and rear surface of the light-transmitting resin, and further having a pair of laterally opposite side surfaces;

the respective upper surfaces of the substrate, the light-transmitting resin and the lightguide plate being substantially flush with each other, and the respective lower surfaces of the substrate, the light-transmitting resin and the lightguide plate being substantially flush with each other.

6. The planar light-emitting device of claim 5, further comprising:
a flexible printed wiring board disposed on the upper surface of the substrate, the flexible printed wiring board extending beyond the rear surface of the substrate;
the reflecting sheet including a first reflecting sheet disposed to face a portion of the upper surface of the lightguide plate adjacent to the light entrance surface, the first reflecting sheet extending beyond the light entrance surface to face the upper surface of the light-transmitting resin, and the first reflecting sheet being disposed above the flexible printed wiring board.

7. The planar light-emitting device of claim 5, further comprising:
a flexible printed wiring board disposed on the upper surface of the substrate, the flexible printed wiring board extending beyond the rear surface of the substrate;
the reflecting sheet including a first reflecting sheet disposed to face a portion of the upper surface of the lightguide plate adjacent to the light entrance surface, the first reflecting sheet extending beyond the light entrance surface to face the upper surface of the light-transmitting resin, and the first reflecting sheet being disposed at substantially a same level as the flexible printed wiring board.

8. The planar light-emitting device of claim 5, wherein the light-transmitting resin has regular reflection layers on the laterally opposite side surfaces, the regular reflection layers having reflecting surfaces facing the laterally opposite side surfaces, respectively.

9. The planar light-emitting device of claim 1, wherein the light-transmitting resin is a substantially rectangular parallelepiped member having an upper surface and a lower surface that each extends between the front surface and rear surface of the light-transmitting resin, and further having a pair of laterally opposite side surfaces;
the reflecting sheet facing at least one of the upper surface and lower surface of the lightguide plate, the reflecting sheet extending beyond the light entrance surface to face one of the upper surface and lower surface of the light-transmitting resin that corresponds to the at least one of the upper surface and lower surface of the lightguide plate;
the light-transmitting resin having a regular reflection layer formed on an other of the upper surface and lower surface of the light-transmitting resin, the regular reflection layer having a reflecting surface on an inner side thereof.

10. The planar light-emitting device of claim 9, wherein the light-transmitting resin has regular reflection layers on the laterally opposite side surfaces, the regular reflection layers having reflecting surfaces facing the laterally opposite side surfaces, respectively.

11. A display apparatus comprising:
an image display panel; and
a planar light-emitting device that irradiates the image display panel with light;
the planar light-emitting device comprising:
a lightguide plate having an upper surface as a light exit surface, a lower surface opposite to the upper surface, and a peripheral edge surface between respective peripheral edges of the upper surface and the lower surface, and a part of the peripheral edge being disposed as a light entrance surface;
at least one light-emitting package including a substrate having a mount surface, at least one light-emitting element mounted on the mount surface of the substrate, and a light-transmitting resin provided on the mount surface to seal the light-emitting element, the light-transmitting resin having a rear surface contacting the mount surface and a flat front surface opposite to the rear surface and abutting on the light entrance surface of the lightguide plate; and
a reflecting sheet disposed to face at least one of the upper surface and lower surface of the lightguide plate, the reflecting sheet extending beyond the light entrance surface and having a reflecting surface facing both the lightguide plate and the light-transmitting resin.

12. The display apparatus of claim 11, wherein the reflecting sheet has a width covering an entire length of the light entrance surface of the lightguide plate.

13. The display apparatus of claim 12, wherein the at least one light-emitting package comprises a plurality of light-emitting packages, the light-emitting packages being disposed in a row at predetermined intervals along the light entrance surface of the lightguide plate.

14. The display apparatus of claim 12, wherein the reflecting sheet comprises:
a first reflecting sheet disposed to face a portion of the upper surface of the lightguide plate adjacent to the light entrance surface, the first reflecting sheet extending beyond the light entrance surface to face the upper surface of the light-transmitting resin; and
a second reflecting sheet disposed to face substantially a whole of the lower surface of the lightguide plate, the second reflecting sheet extending beyond the light entrance surface to face the lower surface of the light-transmitting resin.

15. The display apparatus of claim 12, wherein the substrate is a substantially rectangular parallelepiped member having a rectangular front surface as the mount surface, a rear surface opposite to the front surface, an upper surface and a lower surface that each extends between the front surface and the rear surface, and a pair of laterally opposite side surfaces;
the light-transmitting resin being a substantially rectangular parallelepiped member having an upper surface and a lower surface that each extends between the front surface and rear surface of the light-transmitting resin, and further having a pair of laterally opposite side surfaces;
the respective upper surfaces of the substrate, the light-transmitting resin and the lightguide plate being substantially flush with each other, and the respective lower surfaces of the substrate, the light-transmitting resin and the lightguide plate being substantially flush with each other.

16. The display apparatus of claim 15, further comprising:
a flexible printed wiring board disposed on the upper surface of the substrate, the flexible printed wiring board extending beyond the rear surface of the substrate;
the reflecting sheet including a first reflecting sheet disposed to face a portion of the upper surface of the lightguide plate adjacent to the light entrance surface, the first reflecting sheet extending beyond the light entrance surface to face the upper surface of the light-transmitting resin, and the first reflecting sheet being disposed above the flexible printed wiring board.

17. The display apparatus of claim 15, further comprising:
a flexible printed wiring board disposed on the upper surface of the substrate, the flexible printed wiring board extending beyond the rear surface of the substrate;
the reflecting sheet including a first reflecting sheet disposed to face a portion of the upper surface of the lightguide plate adjacent to the light entrance surface, the first reflecting sheet extending beyond the light entrance surface to face the upper surface of the light-transmitting resin, and the first reflecting sheet being disposed at substantially a same level as the flexible printed wiring board.

18. The display apparatus of claim 15, wherein the light-transmitting resin has regular reflection layers on the laterally opposite side surfaces, the regular reflection layers having reflecting surfaces facing the laterally opposite side surfaces, respectively.

19. The display apparatus of claim 11, wherein the light-transmitting resin is a substantially rectangular parallelepiped member having an upper surface and a lower surface that each extends between the front surface and rear surface of the light-transmitting resin, and further having a pair of laterally opposite side surfaces;
the reflecting sheet facing at least one of the upper surface and lower surface of the lightguide plate, the reflecting sheet extending beyond the light entrance surface to face one of the upper surface and lower surface of the light-transmitting resin that corresponds to the at least one of the upper surface and lower surface of the lightguide plate;
the light-transmitting resin having a regular reflection layer formed on an other of the upper surface and lower surface of the light-transmitting resin, the regular reflection layer having a reflecting surface on an inner side thereof.

20. The display apparatus of claim 19, wherein the light-transmitting resin has regular reflection layers on the laterally opposite side surfaces, the regular reflection layers having reflecting surfaces facing the laterally opposite side surfaces, respectively.

* * * * *